United States Patent
Beutel

(10) Patent No.: US 9,362,574 B2
(45) Date of Patent: Jun. 7, 2016

(54) PEM FUEL CELL SEAL DESIGN AND METHOD FOR MANUFACTURE

(71) Applicant: GM Global Technology Operations LLC, Detroit, MI (US)

(72) Inventor: Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 14/162,252

(22) Filed: Jan. 23, 2014

(65) Prior Publication Data

US 2015/0207156 A1    Jul. 23, 2015

(51) Int. Cl.
*H01M 8/02*    (2006.01)

(52) U.S. Cl.
CPC .......... *H01M 8/0286* (2013.01); *H01M 8/0276* (2013.01); *H01M 8/0284* (2013.01); *H01M 2250/20* (2013.01); *Y02E 60/50* (2013.01); *Y02P 70/56* (2015.11); *Y02T 90/32* (2013.01)

(58) Field of Classification Search
CPC ............ H01M 8/0276; H01M 8/0284; H01M 8/0286; H01M 2250/20; Y02P 70/56
See application file for complete search history.

(56) References Cited

U.S. PATENT DOCUMENTS

2008/0107944 A1* 5/2008 Goebel ............... H01M 8/0271
                                                                    429/434

* cited by examiner

*Primary Examiner* — Brittany Raymond
(74) *Attorney, Agent, or Firm* — Brooks Kushman P.C.

(57) ABSTRACT

A method for forming variable section thicknesses from a uniformly thick resinous sheet in a PEM fuel cell. A method for forming a seal in a fuel cell includes a step of providing a sheet including a layer of resinous material. A first fold is formed in the sheet. The first fold extends from a substantially planar section of the sheet having a first side section and a second side section opposing the first side section and connected by a top section. A gasket is formed by folding the first fold over towards the planar section to form a compound fold. The compound fold is placed between a first fuel cell component and a second fuel cell component to form the seal therein. A fuel cell incorporating the gasket is also provided.

16 Claims, 6 Drawing Sheets

PEM FUEL CELL SEAL DESIGN AND METHOD FOR MANUFACTURE

TECHNICAL FIELD

In at least one aspect, the present invention is related to catalyst layers used in fuel cell applications.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane (i.e., ion conducting membrane) has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles) supported on carbon particles to promote oxidation of hydrogen at the anode, and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL") which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Some prior art fuel cells include gaskets between the catalyst electrodes and ion conducting membrane. Different areas of the repeating cell designs have different functional requirements which are satisfied by utilizing varying cross sectional thicknesses of materials. For example, the fuel cell section depicted in FIG. 1 illustrates a prior art sealing configuration. Fuel cell stack 10 includes a sealing gasket 12 interposed between gas diffusion layers 14 and 16 as well as between bipolar plates 20 and 22. In this example, gasket 12 should be thin when between the gas diffusion layers and thicker between the bipolar plates. Some prior art gaskets use beads 24 in conjunction with a sealing sheet 26 in order to achieve the desired thickness variation.

Accordingly, the present invention provides improved designs for fuel cell gasket components.

SUMMARY

The present invention solves one or more problems of the prior art by providing in at least one embodiment a method for forming a gasket for fuel cell applications. The method includes a step of providing a substantially planar sheet including a layer of resinous material. A first folded sheet is formed from the substantially planar sheet. The first folded sheet has a first fold that extends from a substantially planar section of the substantially planar sheet having a first side section and a second side section opposing the first side section and connected by a top section. A gasket is formed by folding the first fold over towards the planar section to form a compound fold. The compound fold is placed between a first fuel cell component and a second fuel cell component. Advantageously, the gasket forms an electrically insulation, sealing, spacing functionality, or combinations thereof.

In another embodiment, a fuel cell formed by the method set forth above is provided. The fuel cell includes a membrane electrode assembly having an anode side and a cathode side. A first flow field is disposed over the anode side and a second flow field is disposed over the cathode side. A first gas diffusion medium is interposed between the anode side and the first flow field and a second gas diffusion medium is interposed between the cathode side and the second flow field. A gasket is interposed between the first flow field and the second flow field, the gasket defining a central opening. The gasket optionally includes a peripheral sealing region including a resinous material with a compound fold therein. The compound fold includes a first fold in a sheet extending from a substantially planar region of the sheet. The first fold has a first side section and a second side section opposing the first side section such that the first side section and the second side section are connected by a top section. The compound fold includes a second fold formed by folding the first fold over towards a planar section of the sheet.

BRIEF DESCRIPTION OF THE DRAWINGS

Exemplary embodiments of the present invention will become more fully understood from the detailed description and the accompanying drawings, wherein.

DETAILED DESCRIPTION

Figure 1:
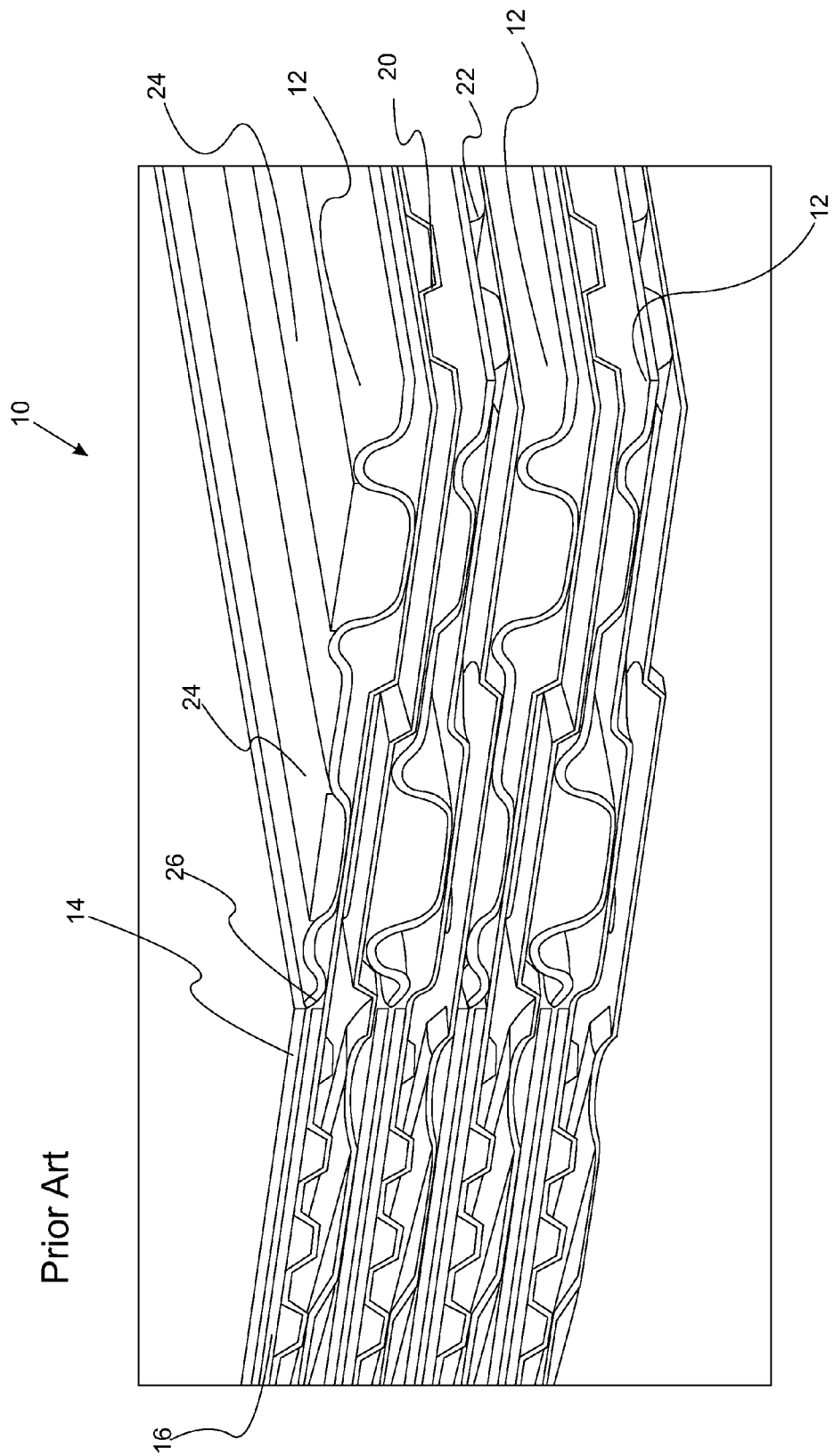
FIG. 1 is a perspective view of a fuel seal stack using a prior art gasket system.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 2A:
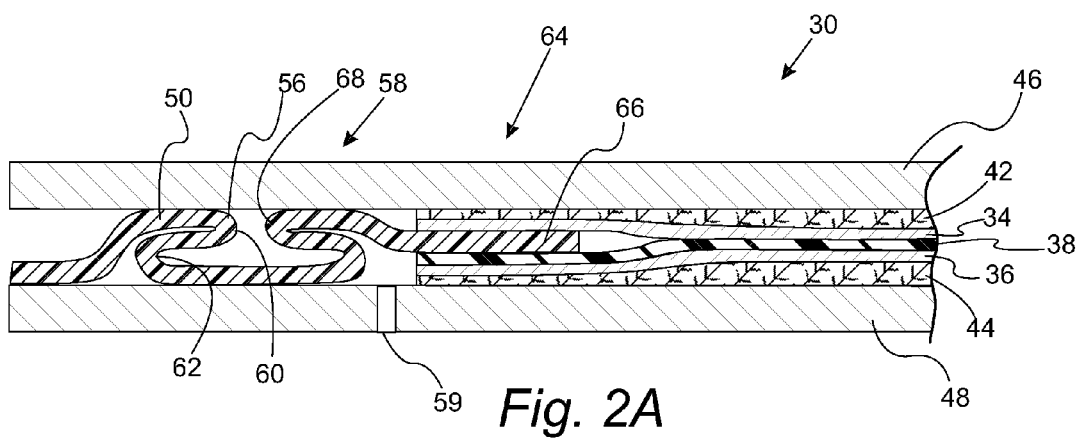
FIG. 2A is a cross section of an embodiment of a fuel cell using a gasket having folded regions.
Figure 2B:
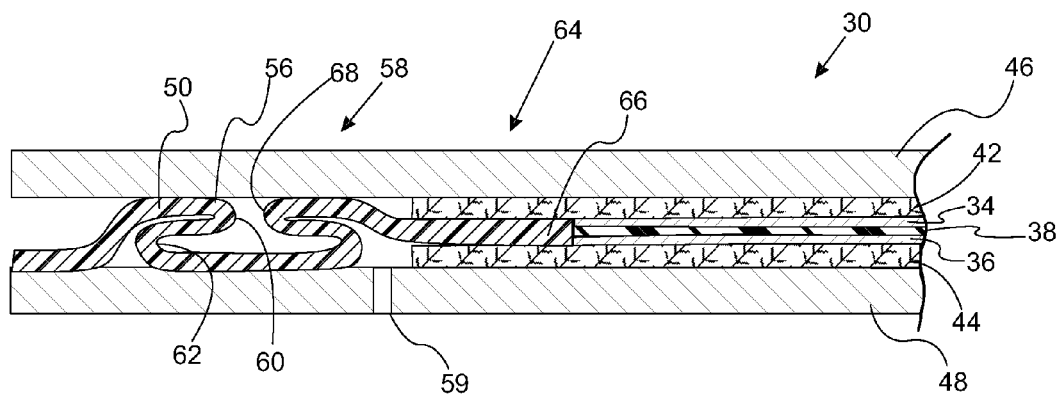
FIG. 2B is a cross section of an embodiment of a fuel cell using a gasket having folded regions.
Figure 3:
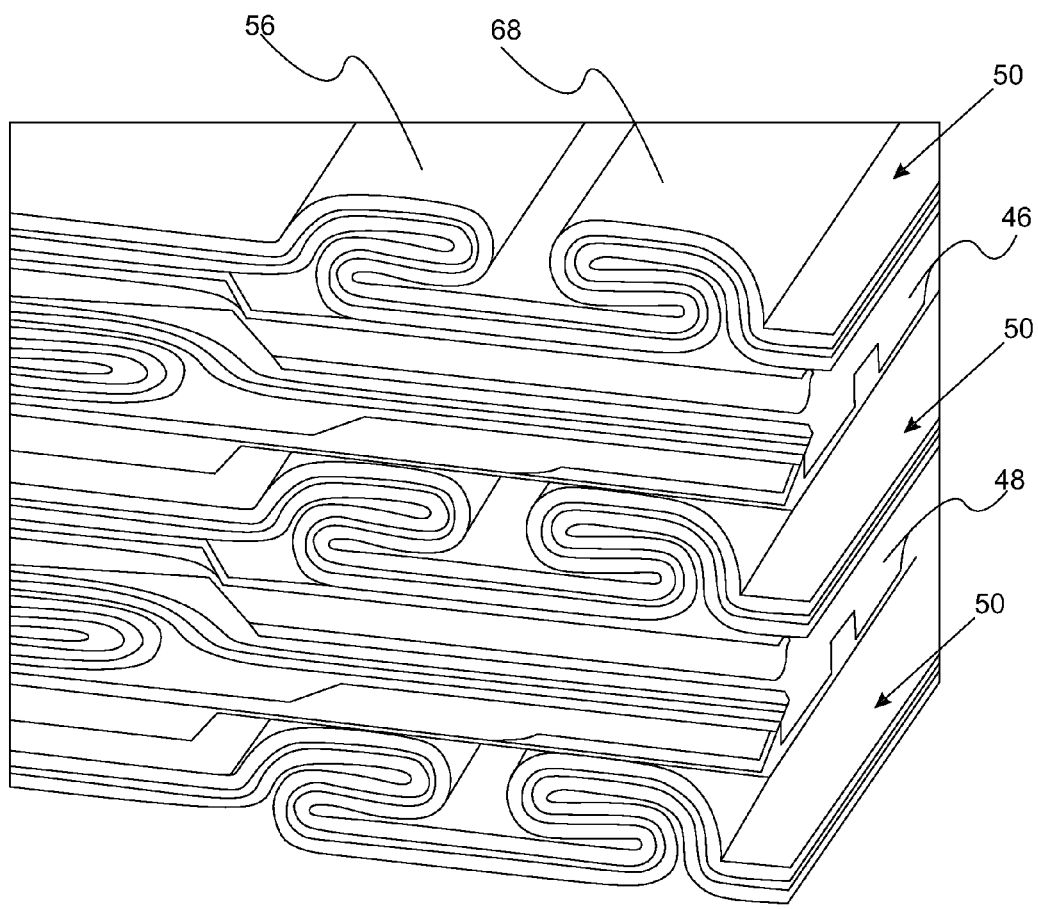
FIG. 3 is a perspective view of an embodiment of a fuel cell using a gasket having folded regions.

With reference to FIGS. 2A, 2B, and 3, schematics illustrating the incorporation of a gasket into a fuel cell is provided. FIG. 2 is a schematic cross section of a fuel cell that incorporates an embodiment of a gasket while FIG. 3 is a perspective view of a portion of a fuel cell stack using the gasket. Fuel cell 30 includes a membrane electrode assembly which includes anode catalyst layer 34, cathode catalyst layer 36, and ion conducting membrane (i.e., proton exchange membrane, ionomer, etc.) 38. Ion conducting membrane 38 is interposed between anode catalyst layer 34 and cathode catalyst layer 36 with anode catalyst layer 34 disposed over the first side of ion conducting membrane 38, and cathode catalyst layer 36 disposed over the second side of ion conducting membrane 38. Fuel cell 30 also includes porous gas diffusion layers 42 and 44. Gas diffusion layer 42 is disposed over anode catalyst layer 34 while gas diffusion layer 44 is disposed over cathode catalyst layer 36. Fuel cell 30 includes anode flow field plate 46 disposed over gas diffusion layer 42, and cathode flow field plate 48 disposed over gas diffusion layer 44. Fuel cell 30 utilizes gasket 50 in order to provide an edge seal.

Figure 4:
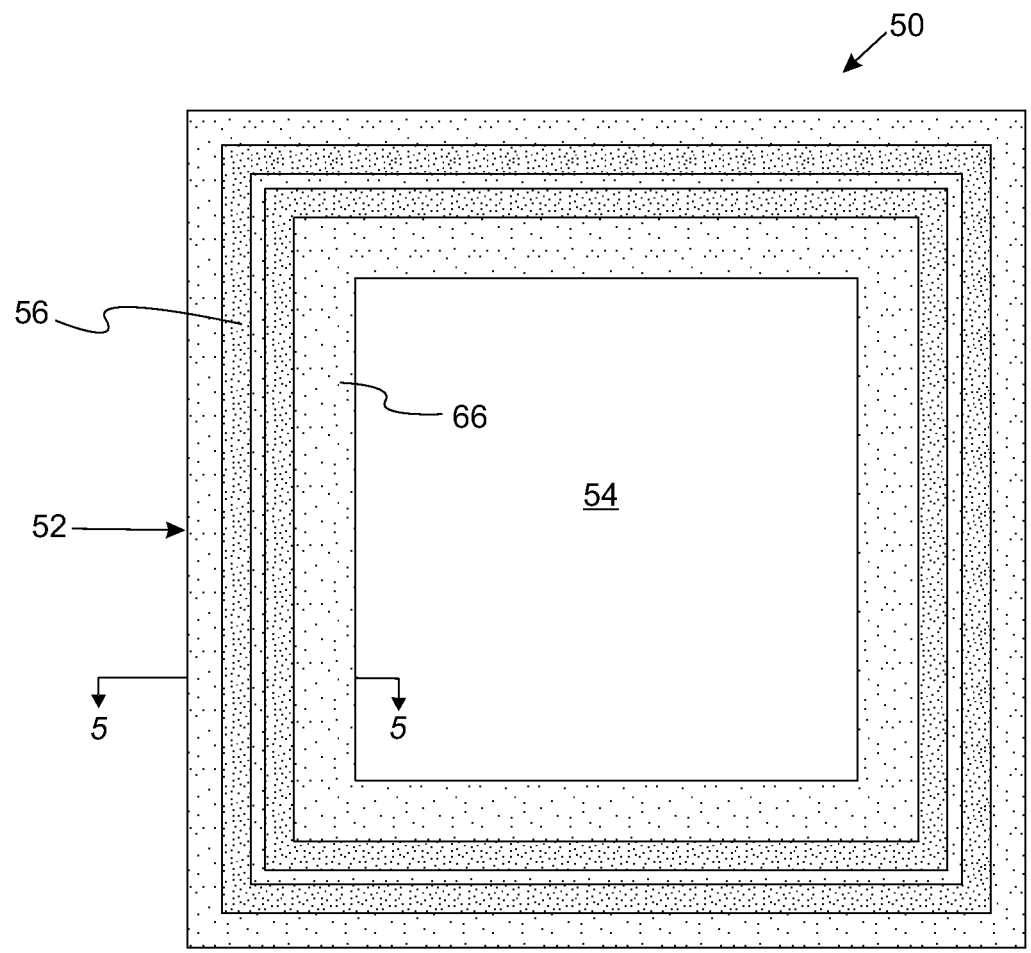
FIG. 4 is a top view of a fuel cell gasket.
Figure 5:
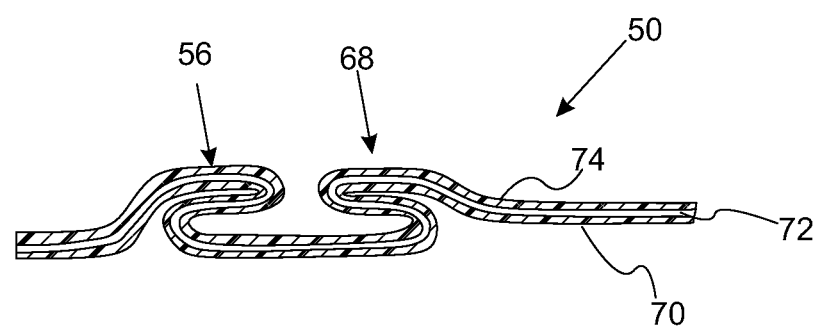
FIG. 5 is a cross sectional view of a fuel cell gasket.

With reference to FIGS. 2A, 2B, 3, 4, and 5, schematics illustrating the design of gasket 50 are provided. FIG. 4 is a top view of gasket 50 while FIG. 5 is a cross sectional view of gasket 50. In general, gasket 50 includes peripheral sealing region 52 which defines central opening 54. Gasket 50 includes compound fold 56 in region 58 in order to provide sealing between anode flow field plate 46 and cathode flow field plate 48. In another refinement, the gasket also provides a seal for reactant and coolant header apertures depicted generally by item 59. Examples of such apertures are set forth in U.S. Pat. No. 8,524,414; the entire disclosure of which is hereby incorporated by reference. The term "compound fold" as used herein means a region that is folded at least twice. For example, compound fold 56 includes first fold 60 and second fold 62. Near the edge 64 of the gas diffusion layers, gasket 50 includes thinner (i.e., unfolded) region 66 in order to provide sealing therein. In a refinement, gasket 50 includes two compound folds—compound fold 56 and compound fold 68. In one variation, a portion of gasket 50 is interposed between a catalyst layer (anode or cathode catalyst layer) and ion-conducting membrane 38. FIG. 2A depicts the gasket interposed between the anode catalyst layer and the ion-conducting membrane. FIG. 2B depicts an example with gasket 50 interposed between and contacting gas diffusion layer 42 and gas diffusion layer 44.

In one variation, gasket 50 is formed from a sheet of resinous material. In a refinement, the sheet of resinous material includes a thermoplastic polymer. Examples of suitable thermoplastic polymers include, but are not limited to, polyethylene, polypropylene, polyethylene terephthalate, polyethylene naphthalate, polyphenylene ether, polyphenylene oxide, and combinations thereof. The sheet of resinous material may include a single layer or a laminate structure. Typically, the laminate structure is a multilayer thermoplastic or a thermoplastic with a non-thermoplastic elastomer layer (e.g., silicon, ethylene propylene diene monomer rubber, etc.). In a refinement as set forth in FIG. 5, the laminate structure includes a first solid layer 70 and a first foamed layer 72, and an optional second solid layer 74. First foamed layer 72 is interposed between the first solid layer 70 and the second solid layer 74. In another refinement, the first solid layer, the second solid layer, and the first foamed layer each independently include a thermoplastic polymer as set forth above.

Figure 6A:
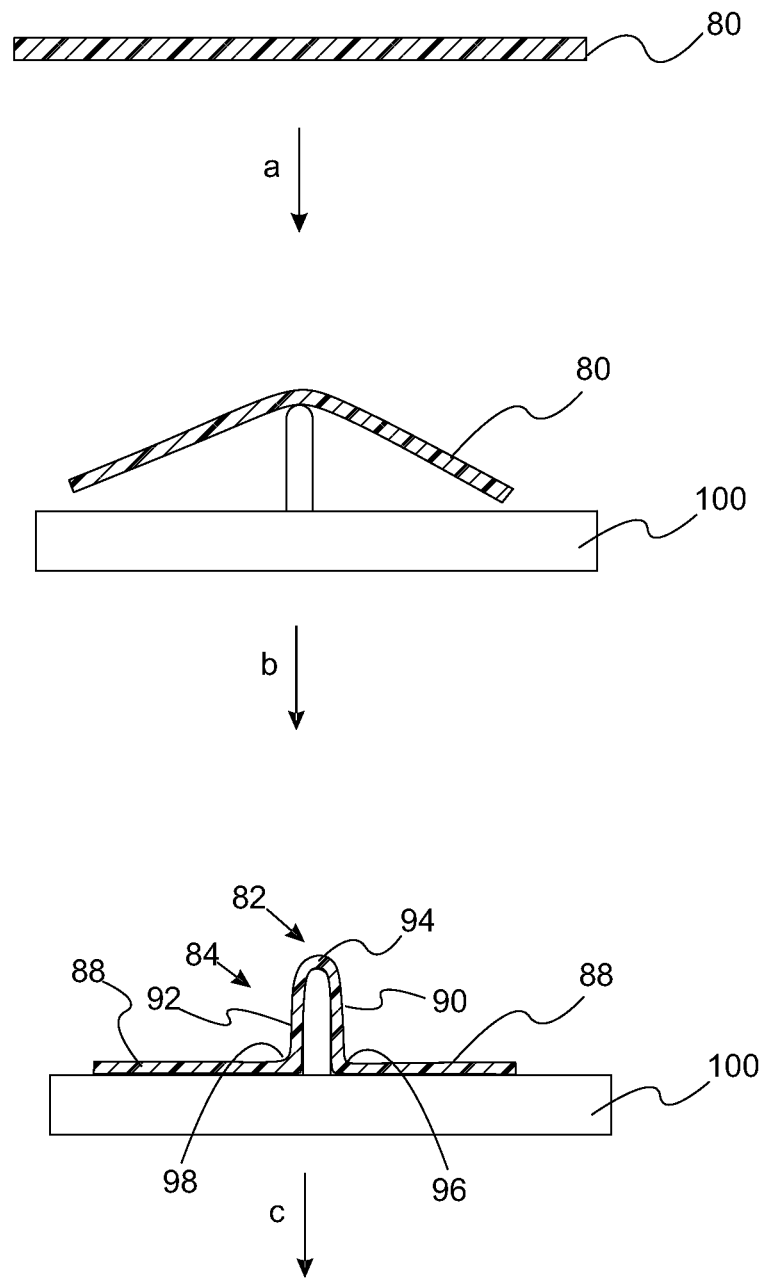
FIGS. 6A and 6B provide a schematic flow chart of a method for forming a gasket for fuel cell applications.
Figure 6B:
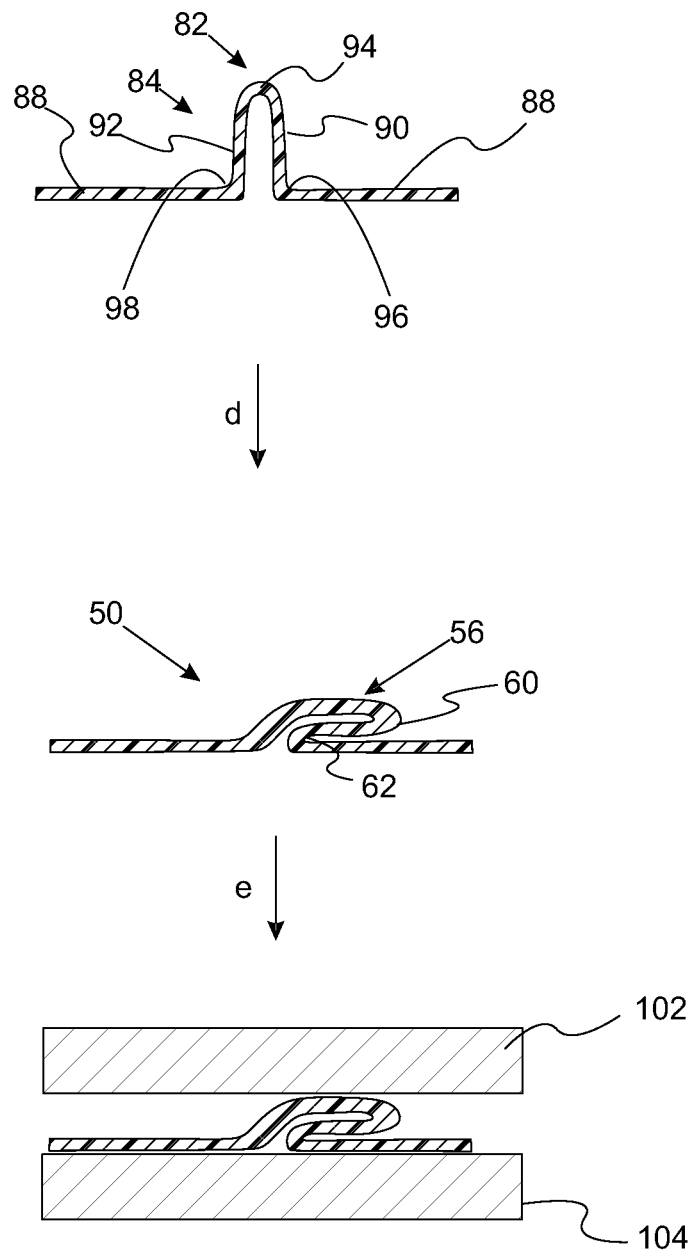

With reference to FIGS. 6A and 6B, a method for forming a seal in a fuel cell is provided.

The method includes a step of providing substantially planar sheet 80 which includes a layer of resinous material. In a refinement, the layer of resinous material includes a thermoplastic polymer as set forth above. In another refinement, substantially planar sheet 80 has a thickness from about 0.050 mm to about 1 mm. First folded sheet 82 is formed from substantially planar sheet 80. First folded sheet 82 includes first fold 60 which typically includes protrusion section 84 that extends substantially planar section 88. First fold 60 includes first side section 90 and second side section 92 which opposes first side section 90. First side section 90 and second side section 92 are connected by top section 94. First folded sheet 82 also includes intermediate folds 96 and 98.

Typically, first fold 60 is formed by drawing substantially planar sheet 80 over mandrel 100 as depicted by step a). In this step, uniformed thinning can be maintained. In a refinement, substantially planar sheet 80 is heated to assist in forming first fold 60. In this regard, sheet 80 is typically heated to a temperature from about 90 to 300 degrees C. In step b), a vacuum is applied (i.e., vacuum forming) to impart a mandrel form onto the sheet thereby forming the first fold 60. After such forming, first folded sheet 82 with the first fold therein is removed from the mandrel in step c). In step d), gasket 50 is formed by folding the first fold, and in particular, protrusion section 84 over towards the planar section to form compound fold 56. Gasket 50 and, therefore, compound 56 are placed between first fuel cell component 102 and second fuel cell component 104 to form a seal. In a refinement, gasket 50, and in particular, the compound fold is allowed to cool after being placed between first fuel cell component 102 and second fuel cell component 104. In a refinement as set forth above, the first fuel cell component and the second fuel cell component are each independently flow fields. In one refinement, gasket 50 is used to form a seal between such component and/or in apertures in such components. In another refinement, gasket 50 is used to form an insulating layer between the fuel cell components and in particular electrically conductive fuel cell components such as the flow field plates. In another refinement, gasket 50 is used to provide thicker insulation or spacing material in desired areas between electrically conductive components of serially adjacent fuel cells. Additional placement of gasket 50 are set forth above with respect to the description of FIGS. 2A and 2B.

In a refinement, sheet 80 has a laminate structure. Typically, the laminate structure is a multilayer thermoplastic or a thermoplastic with a non-thermoplastic elastomer layer. In a refinement, the laminate structure includes a first solid layer and a first foamed layer, and an optional second solid layer, the first foamed layer being interposed between the first solid layer and the second solid layer. In another refinement, the first solid layer, the second solid layer, and the first foamed layer each independently include a thermoplastic polymer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   providing a substantially planar sheet including a layer of resinous material;
   forming a first folded sheet from the substantially planar sheet, the first folded sheet having a first fold extending from a substantially planar section of the first folded sheet, the first fold having a first side section and a second side section opposing the first side section, the first side section and the second side section connected by a top section;
   forming a gasket by folding the first fold over towards the planar section to form a compound fold, the compound fold having the first side section adjacent to the substantially planar section; and
   placing the compound fold between a first fuel cell component and a second fuel cell component.

2. The method of claim 1 wherein the first fold is formed by drawing the sheet over a mandrel and heated to assist in forming the first fold.

3. The method of claim 2 wherein the sheet is heated to a temperature from about 90 to 300 degrees C.

4. The method of claim 3 further comprising applying a vacuum to impart a mandrel form onto the sheet thereby forming the first fold.

5. The method of claim 2 wherein the sheet with the first fold therein is removed from the mandrel.

6. The method of claim 1 wherein the compound fold is allowed to cool after being placed between the first fuel cell component and the second fuel cell component.

7. The method of claim 1 wherein the first fuel cell component and the second fuel cell component are each independently flow fields.

8. The method of claim 1 wherein the gasket forms an electrically insulation, sealing, spacing functionality, or combinations thereof.

9. The method of claim 1 wherein the layer of resinous material includes a thermoplastic polymer.

10. The method of claim 9 wherein the thermoplastic polymer comprises a component selected from the group consisting of polyethylene, polypropylene, polyethylene terephthalate, polyethylene naphthalate, polyphenylene ether, polyphenylene oxide, and combinations thereof.

11. The method of claim 1 wherein the gasket has a peripheral sealing region, the gasket defining a central opening.

12. The method of claim 1 wherein the sheet has a laminate structure.

13. The method of claim 12 wherein the laminate structure includes a first solid layer and a first foamed layer, and an optional second solid layer, the first foamed layer being interposed between the first solid layer and the second solid layer.

14. The method of claim 13 wherein the first solid layer, the second solid layer, and the first foamed layer each independently include a thermoplastic polymer.

15. The method of claim 14 wherein the sheet has a thickness from about 0.050 mm to about 1 mm.

16. The method of claim 12 wherein the laminate structure is a multilayer thermoplastic or a thermoplastic with a non-thermoplastic elastomer layer.

* * * * *